United States Patent [19]

Schwarz

[11] 4,355,351
[45] Oct. 19, 1982

[54] HIGH REPETITION RATE POWER PULSE GENERATOR

[76] Inventor: Francisc C. Schwarz, Round Hill Rd., Lincoln, Mass. 01773

[21] Appl. No.: 43,882

[22] Filed: May 30, 1979

[51] Int. Cl.³ .................. H02M 5/27; H02M 7/19
[52] U.S. Cl. .................................... 363/9; 363/61; 363/160
[58] Field of Search .................... 363/8–10, 363/59–61, 128, 130, 135–139, 159, 160, 164–165, 170, 173; 307/106, 107

[56] References Cited

U.S. PATENT DOCUMENTS

| | | | |
|---|---|---|---|
| 3,046,466 | 7/1962 | Tyrrell et al. | 363/61 |
| 3,659,184 | 4/1972 | Schwarz | 363/15 |
| 3,953,779 | 4/1976 | Schwarz | 363/28 |
| 4,096,557 | 6/1978 | Schwarz | 363/9 |

Primary Examiner—William M. Shoop
Assistant Examiner—Peter S. Wong
Attorney, Agent, or Firm—Frijouf, Rust & Pyle

[57] ABSTRACT

Disclosed is a class of power converters which extract electric energy from a source of A.C. or D.C. power and transform this energy to a desired and closely controlled voltage level for use by a pulse demanding load such as a pulsed radar or laser system. The converter eliminates the need for a D.C. link anywhere in the converter system and the need for low frequency power filters. The invention includes a transformerless circuit with galvanic isolation between system input and output terminals and controlled voltage scaling.

27 Claims, 3 Drawing Figures

HIGH REPETITION RATE POWER PULSE GENERATOR

CROSS REFERENCE TO RELATED APPLICATIONS

This application is a further development of my prior U.S. Pat. Nos. 3,953,779 issued Apr. 27, 1976 and 4,096,557 issued June 20, 1978, the contents of which are hereby incorporated by reference.

BACKGROUND OF THE INVENTION

This invention relates to power converters which transform electric energy from a polyphase A.C. or a D.C. source to a recurrent train of discrete quantities of energy. These quantities of energy can be utilized in pulse forming networks which feed a pulse energy demanding load for a recurrent succession of operation. Typical loads of this kind are pulsed laser or radar systems.

Static power converters of the kind as just described are well known in the art. One representative kind consists of a cascaded succession of (1) a three phase full wave rectifier, (2) a low freqeuncy D.C. filter to smooth the remanents of the A.C. content in the rectified A.C. voltage, (3) a regulating type of D.C. to D.C. converter with a built in voltage scaling device such as a transformer and (4) an output filter to smooth the effects of the internal operation of the aforesaid D.C. to D.C. converter. The output power of the aforesaid output filter is then used to charge a discharge capacitor which, at times, is isolated from the above described source of supply and then connected to a pulse energy load, such as a laser system. The above power converter system performs a valuable and needed function in present day technology.

This present day state of the art system also embodies passive low frequency filters to smooth the A.C. ripple content of the rectified A.C. power and of dissipative waveshaping of the charging voltage for the aforesaid charging capacitor. The system also requires accurate feedback control electronics to stabilize the voltage for the aforesaid discharge capacitor. Passive low frequency filters are inherently bulky, have a heavy physical weight, and are costly. The efficiency of charging capacitors via a dissipative-resistive element is limited to 50 percent at best with the balance of energy being dissipated, or transformed to heat in the aforesaid resistive elements. Thus more energy is transformed into heat in this process than transferred for a useful purpose to the discharge capacitor. The amount of this heat dissipation in the series resistive element of a capacitor charging process is also documented in my doctorate dissertation "A Class of Nonlinear Active Filter for Electric Energy Conversion", Cornell University, 1965. The above resistive element is often partially or wholly embodied in power controlling solid state elements, such as power transistors. The need to let the converter's output voltage follow the replica of a reference signal, which often takes, partially, the form of a ramp function, requires close guidance of the power flow by way of a feedback control system with all of the associated stability problems. These problems cause a certain degree of complexity of the electronic control system.

The state of the art power converters for pulsed loads, as described above, thus involve substantial bulk of apparatus caused by low frequency filters. Substantial heat is also developed requiring adequate provisions for cooling and thus entailing physical bulk of apparatus. In addition, a complex electronic control system is required for dynamic stabilization, thus raising functional hazards.

SUMMARY OF THE INVENTION

This invention comprises a type of power converter which transform directly polyphase A.C. or D.C. energy to controllable trains of recurrent discrete quantities of energy by way of interposition of a nonlinear and nondissipative resonant high frequency link between the source of supply and the pulse forming discharge capacitor. A significant part of this high frequency link comprises switch controlled series resonant circuits to provide natural commutation of switched currents. This technique results in high efficiencies of power conversion at relatively high internal switching pulse frequencies, presently, in the order up to 100 kHz. The flow of electric energy is controlled and smoothed by an active filtering process and all passive low frequency filters and the associated bulk and cost are avoided.

The high internal frequency allows an output pulse repetition rate of, approximately, one tenth of the internal pulse frequency, thus presently enabling an output pulse repetition rate PRR in the order of 10 kHz. Accordingly, it is an object of this invention to improve the technology of power supply systems for pulse powered loads, such as laser and radar systems by the direct extraction of energy from an A.C. or D.C. source and the accurate nondissipative transfer to the discharge capacitor of the pulse forming network of the load.

It is a further object of this invention to apply active filtering techniques for the purpose of replacing all low frequency filters, which are used to suppress the ripple voltages which emanate from A.C. supply sources.

It is yet another object of this invention to apply nondissipative processes of energy transfer and voltage waveshaping in order to achieve a high efficiency of operation.

It is another object of this invention to perform the aforesaid transfer of energy without the use of a D.C. link in the system.

It is yet a further object of this invention to operate a relatively high internal frequency in order to allow load pulse frequencies in excess of 10 kHz at power levels of kilowatts and beyond.

It is yet another object of this invention to facilitate the turn-on and turn-off of switching elements by way of the operation within internal resonant circuits.

It is, furthermore, yet another object of this invention to measure the charge on the aforesaid discharge capacitor, independent of supply line variations and variations of the power circuit component characteristics, due to aging or changes of environmental conditions.

It is, furthermore, yet another object of this invention to scale the D.C. input voltage or the apparent D.C. input voltage of an A.C. powered converter to a desired level by way of a resonant circuit which includes a LC ladder-network without the use of an internal high voltage transformer.

BRIEF DESCRIPTION OF THE DRAWINGS

The above mentioned and other objects of the invention will become apparent from the following detailed description of the invention when read in conjunction with the attached drawings.

DESCRIPTION OF THE PREFERRED EMBODIMENT

Figure 1:
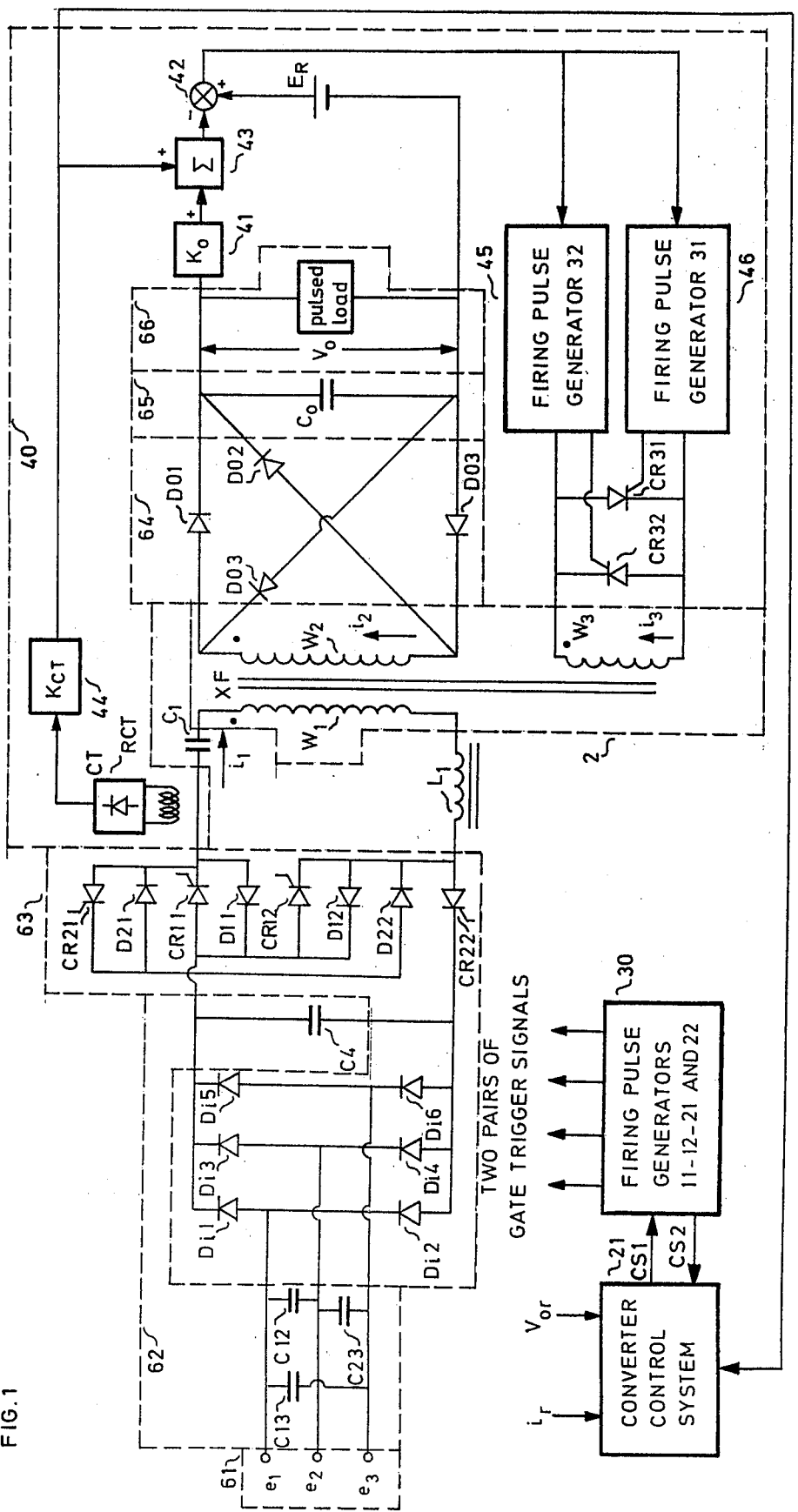
FIG. 1 is the block diagram of the A.C. or D.C. to discrete pulse power converter in its preferred embodiment, using direct conversion from a low power frequency to a high internal frequency by way of a cyclo-up converter, followed by a voltage scaler in the form of a high frequency power transformer-rectifier, for transfer of energy to a pulse discharge capacitor.
Figure 3:
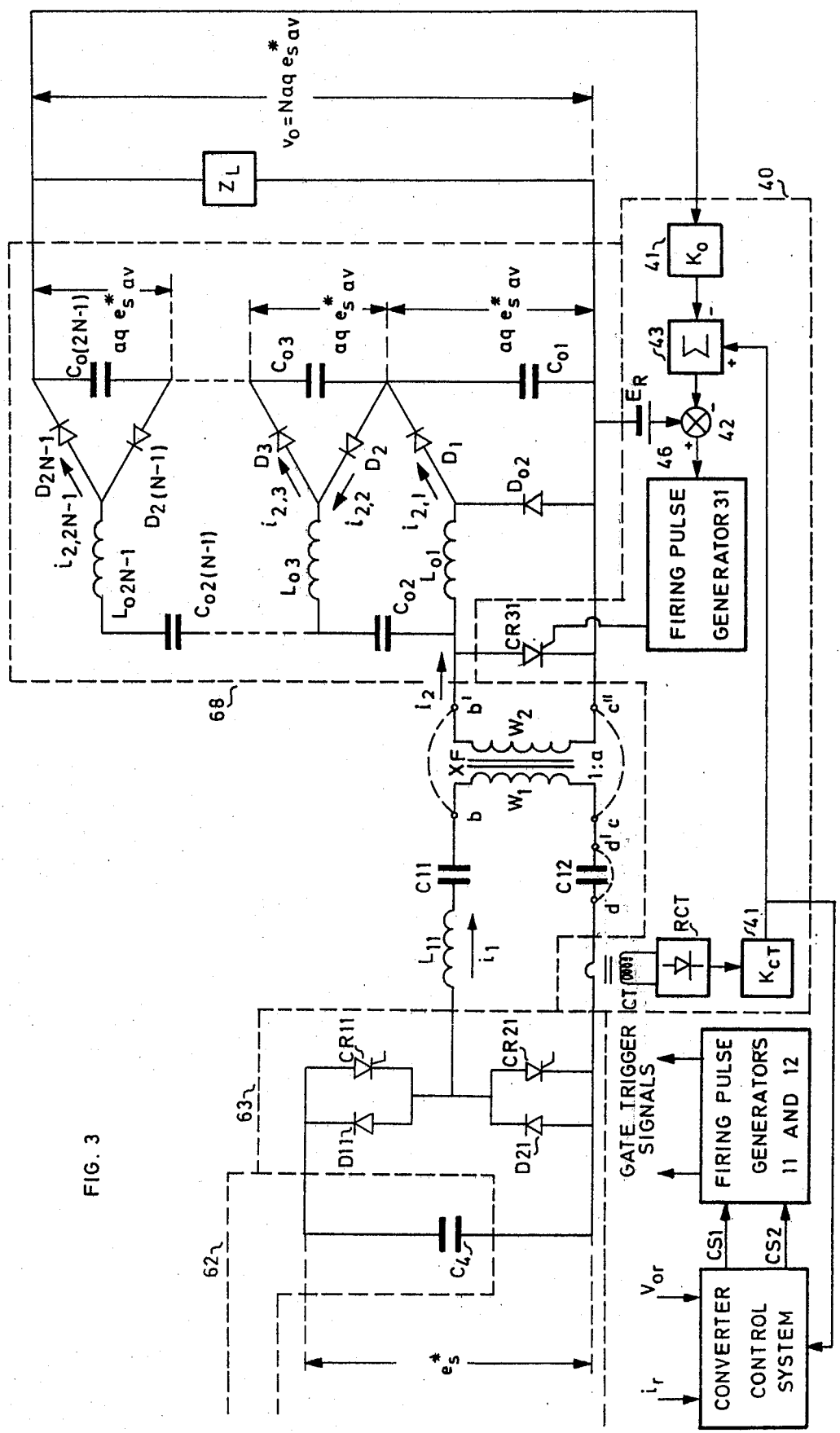
FIG. 3 is the block diagram of the disclosed converter, in which a capacitor multiplier is substituted for the high voltage scaling function of the power transformer.

In the drawings inductors, capacitors, transformers, rectifiers and controlled rectifiers are designated by conventional symbols and by reference characters L, C, XF, D and CR, with various subscripts, respectively. In the specification and claims, the reference characters for inductors, capacitors, diodes and controlled rectifiers may also be used as algebraic symbols to represent the inductance in Henrys and the capacitance in Farads. In each case the sense of the usage will be clear from the context. The invention will be described as it is applied with the use of series resonant circuits, as shown in FIG. 1. However, this invention is not restricted to its use, as shown in FIGS. 1 and 3. It is readily applied to types of systems which transfer energy from an A.C. or D.C. source of any kind to any load which requires a periodic and uniform train of pulses of electric power or a programmable aperiodic and nonuniform train of such pulses or any combination thereof. Converters employing series resonant circuits for controlled and continuous transfer of energy are well known in the art and are described primarily in the U.S. Pat. No. 4,096,557 issued June 1978; U.S. Pat. No. 3,953,779 issued April 1976; my articles in the IEEE Transactions on Industrial Electronics and Control Instrumentation IECI-17 and 23 of May 1970 and 1976 respectively, U.S. Pat. No. 3,659,184 of April 1972; Bedford, B. D. and Hoft, R. G., "Principles of Inverter Circuits", Wiley, New York, 1964; a transformerless uncontrollable voltage scaler is described by Cockcroft, J. D., in the Proceedings of the Royal Society, Vol. 136, p. 619, London, 1932.

The invention is now further described with reference to the attached figures and should be read in close context with the first two above named references. Referring now, specifically to FIG. 1: the converter derives its energy from a polyphase generator 61, indicated here as a three phase sine wave supply line. The polyphase A.C. power enters the power converter via a polyphase A.C. high frequency filter 62. This filter has a cut-off frequency that is lower than twice the lowest internal converter frequency, but which is approximately two orders of magnitude, or more above the low frequency of the polyphase supply line. The purpose of this filter is to isolate the effects of internal converter operation from the supply lines of A.C. power. A filter of rather moderate electrical and physical size is required to suppress high frequency components of the harmonic content which is generated in the currents of the individual phases of the A.C. supply lines caused by the converter operation.

Figure 2:
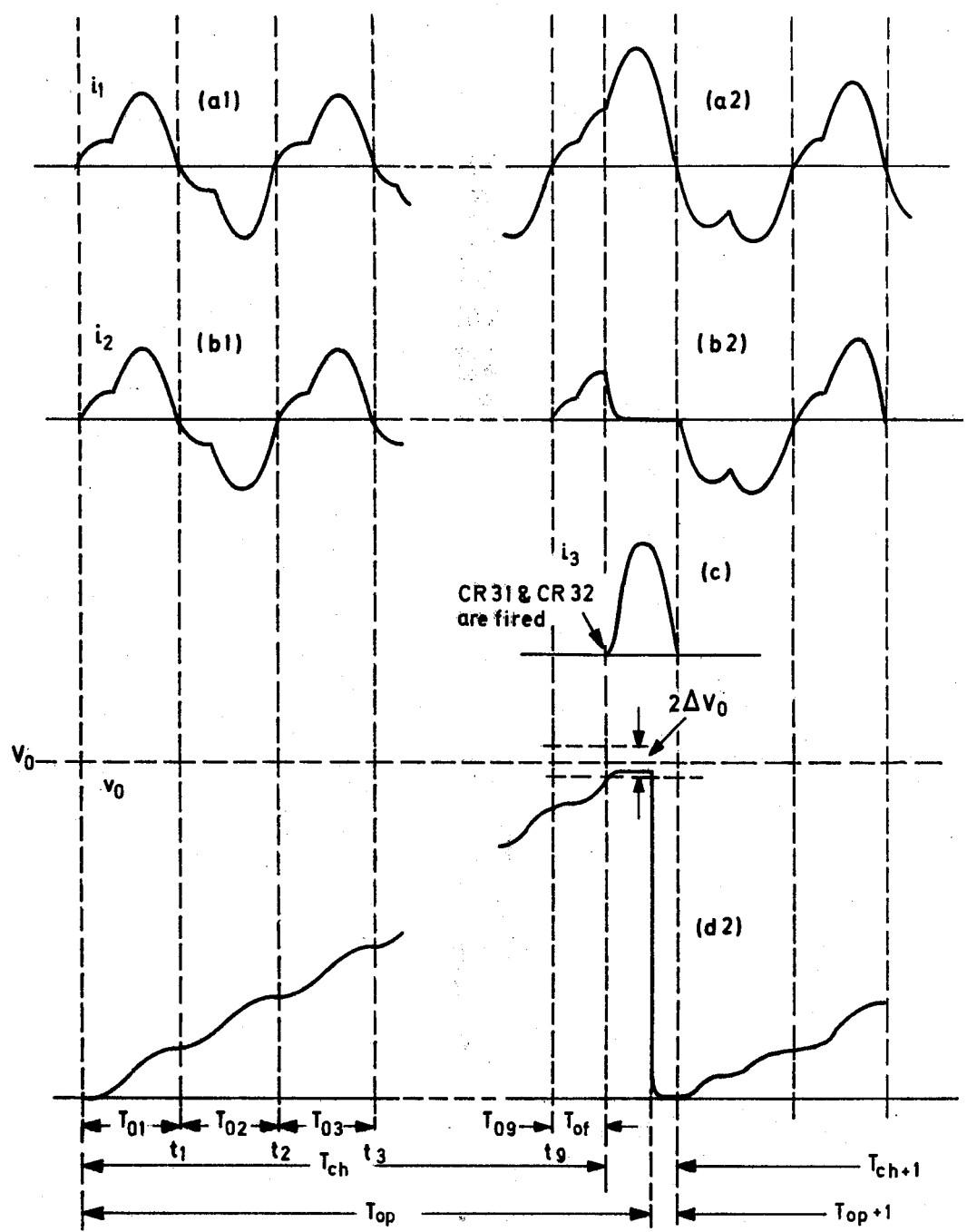
FIG. 2 shows the critical current and voltage waveforms of the converter.

The significant part of the process of extraction of energy from the polyphase supply line and the transformation to power pulses is carried out as follows. A switching matrix 63 transfers electric power from the three phase source 61 to a series resonant circuit comprising a capacitor $C_1$ and an inductor $L_1$. This resonant circuit is terminated in the reflection $C_{ol}$ of a discharge capacitor $C_o$, which is reflected back into the resonant circuit via an output rectifier diode bridge 64 and a transformer XF, which is identified as system element 2. The rectifier bridge 64 causes the development of a voltage $v_2$ on a primary winding $W_1$ of the transformer XF, which always opposes the direction of flow of the resonant current $i_1$ in the aforesaid resonant circuit. The aforesaid resonant circuit is, therefore, terminated in the reflection $C_{ol} = a^2 C_o$ of the output capacitor $C_o$, which is (1) modified in magnitude by the square of the turns ratio $N_2/N_1 = a$, of the windings $W_2$ and $W_1$ of the aforesaid transformer XF, with the understanding that winding $W_1$ has $N_1$ turns and winding $W_2$ has $N_2$ turns, wound around the commonly enclosed magnetic flux path of the transformer core. The aforesaid switch matrix 63 selects at any time the phase pair with the largest voltage difference $e_i - e_j$ (i,j=1,2,3; $i \neq j$), when compared to the other then prevailing phase voltage differences in the same A.C. supply system. Power is then extracted in a logically following succession from the above identified phase pairs and used to generate the resonant current carrier $i_1$ as described in the first two above cited references and elucidated in the thereafter following fourth reference. A quasi-sinusoidal resonant current $i_1$ with a frequency in the order of 10 kHz or 100 kHz is thus generated and possibly modulated, as described in the aforesaid references and as illustrated in FIG. 2(al).

The aforesaid resonant current $i_1$ in winding $W_1$ of the transformer XF causes the flow of a current $i_2 = i_1/a$ in the winding $W_2$ of the same transformer. The rectified current $|i_2|$ charges the capacitor $C_o$ to a voltage $$v_o = (1/C_o) \sum_{k=1}^{n} \int_{t_{k-1}}^{t_k} |i_2| dt; \ t_{k-1} \leq t < t_k; \ t_{k+1} - t_k = T_{ok} \quad (1)$$

where n = the number of the successive half cycli of $i_2$, when counting from the time when $v_o = 0$ k = index 1,2, . . . n for each of the n half cycli as defined above $$t_k = \sum_{m=1}^{n} T_{om}; \ m = 1,2, \ldots n; \ T_{om} \neq T_{om+1}$$

No charge is removed from the capacitor $C_o$ during the above described process, so that equation (1) remains valid until the just described process of charging of the capacitor $C_o$ is altered.

The objective of the present invention is to charge capacitor $C_o$ with a number of not more than N half cycli or pulses of the current $i_2$ to a nominal voltage $V_o$ as prescribed by the requirements for the present converter. The voltage $v_o$ reaches, eventually, after a number of N−1 half cycli of the secondary resonant current $i_2$ a magnitude $$V_o > v_o(t_{N-1}) > V_o - (1/C_o) \int_{t_{N-1}}^{t_N} |i_2| dt \quad (2)$$

This means that the voltage $v_o$ of the capacitor has reached after the (N−1)th cycle a magnitude $v_o(N−1)$, which is smaller than the nominal target $V_o$, but the addition of further charge contained in another half cycle of $|i_2|$ may cause the said voltage $v_o$ to exceed the intended target $V_o$.

A mechanism is now described which the that the said voltage $v_o$ will remain within a tolerance of $\pm \Delta V_o$ of the nominal value $V_o$, so that at the termination of the charging time $T_{ch}$ of the capacitor $C_o$ its voltage will be within the limits $$V_o - \Delta V_o < v_o(T_{ch}) < V_o + \Delta V_o \qquad (3)$$

where $$T_{ch} = t_{N-1} + T_{of}$$

This process is illustrated in FIGS. 2(d1) and 2(d2), where N−1 is arbitrarily chosen so that N−1=9 and thus $t_{N-1} = t_9$. The capacitor voltage $v_o$ satisfies then the conditions described with the inequality (2). The addition of the charge of one more half cycle of $|i_2|$ would cause an increase of the voltage of capacitor $v_o$ beyond its limits as defined by the inequality (3) above. The charging process is at the point in time $t = t_{N-1}$ with the (N−1)th cycle being illustrated as the 9th cycle in FIGS. 2(d1) and 2(d2) at the time $t_9$. Each of the said charging cycles corresponds to one of the one half cycles of the secondary resonant current $i_2$. The Nth charging cycle of the capacitor $C_o$ is initiated notwithstanding the fact that a completion of this cycle would lead to a violation of the inequality (3) and thus fail to secure a compliance of $v_o$ with the intended purpose, as required by this inequality (3). The voltage of the capacitor $C_o$ thus starts to rise according to $$v_o = v_o(t_{N-1}) + (1/C_o) \int_{t_{N-1}}^{t - t_{N-1}} |i_2| dt \qquad (4)$$

An instant of time $T_{ch} = t_{N-1} + T_{of}$ is eventually reached when $$v_o(T_{ch}) = V_o - L_o|i_1| \qquad (5)$$

when $$L_o = 2\epsilon_o/i_1^2 \text{ and}$$

$\epsilon_o$ = the energy which will be yet conveyed to the capacitor $C_o$ after a command to fire the thyristors CR31 and CR32 and thus to short circuit the transformer XF by way of a tertiary winding $W_3$ is given.

The primary resonant current $i_1$ is monitored by a current sensor in the form of a current transformer CT, as shown in FIG. 1. The resulting signal is rectified by a rectifier RCT and then conveyed to an attenuator 44, which reduces the rectified signal by an appropriate factor $K_{CT}$. The resulting signal is added in a summer 43 to the voltage $v_o$ of capacitor $C_o$ after attenuation by an attenuator 41 by a factor $K_o$. The output of the summer 43 is then compared to a reference signal $E_R$ by a discriminator 42. All of these system components are part of the output voltage detector and stabilizing subsystem, illustrated within block 40 of FIG. 1. The above cited constants $K_{CT}$ and $K_o$ are so dimensioned, that the discriminator 42 emits a signal when the condition stated in equation (5) occurs. The aforesaid signal of the comparator 42 energizes a firing pulse generators 45 and 46 which energize or "fire" thyristors CR31 and CR32. Winding $W_3$ of the transformer XF is thus short circuited and the conditions of equation (5) are satisfied, provided that an appropriate quantitative relationship is established between the magnitudes of $L_o$, the constants $K_{CT}$ and $K_o$, and possibly, the effect of delays in the signal transmission, including the "firing" of the above identified thyristors CR31 and CR32.

The equation (5) is derived from the energy balance $$\tfrac{1}{2}\{v_o(T_{ch})\}^2 C_o + \tfrac{1}{2}L_o i_1^2 = \tfrac{1}{2} V_o^2 C_o \qquad (6)$$

Equation (5) follows from (6) after differentiation of (6) and introduction of the necessary integration constant $C_I = 0$ since the concerned voltages $v_o$ and $V_o$ are identical in (5) and (6) and the term $\tfrac{1}{2}L_o i_2^2 = 0$ for $i_1 = 0$. The constant $L_o$ is established by an analytical/experimental process, as well known in the art. The range of tolerance, defined by the inequality (3) allows to accomodate minor variations that may be rooted in the tolerances caused by the physical structures of the concerned components. Refinements of the described process can be applied, if necessary, as known to those experienced in the art.

Some significant aspects of the here described process are illustrated in FIGS. 2(a2), 2(b2), 2(c) and 2(d2). The current $i_3$ originates after thyristors CR31 and CR32 are fired as shown in FIG. 2(c). This current $i_3$ satisfies Ampere's law of equal ampere-turns with respect to the current $i_1$. The voltage which was previously induced in winding $W_2$ of the transformer XF collapses and the diodes $DO_i$ (i = 1,2,3,4) in the output rectifier bridge 64 are "cut off" after the energy $\epsilon_o$, as defined above, has been discharged into the output capacitor $C_o$. It is seen in FIGS. 2(b2) and 2(a2) that the current $i_2$ is reduced to zero after the time interval $T_{ch}$, notwithstanding the fact that the primary resonant current $i_1$ continues to flow and even increases temporarily in amplitude, as qualitatively indicated in FIG. 2(a2). The option to short circuit the power transformer XF in the above described manner without causing undue stresses in the system is a unique property of the present power converter employing a series resonant. An explanation of the therewith associated phenomena is contained in the first, the second and the fourth reference cited above. Discharge of the capacitor $C_o$ via a pulse demanding load at the time $T_{op}$ is implied by the steep fall of the voltage $v_o$ at that time, as illustated in FIG. 2(d2). The converter resumes the charging process shortly thereafter as implied by the repetition of the "staircase" voltage $v_o$ in the following time interval $T_{ch+1}$.

The individual charge intervals $T_{ch} \neq T_{ch+1}$ need not to be equal, depending upon several factors including the degree of discharge of the capacitor $C_o$, the change in the input voltages $e_i$ (i = 1,2,3) the respective time value of $e_i - e_j$ as defined above, and the change of component characteristics due to ageing, variations of temperature and other related causes. Yet the present invention will satisfy the inequality (3) independently of the above enumerated phenomena, which could otherwise cause a deviation of $v_o(T_{ch})$ from the nominal value $V_o$ in excess of a required and predetermined limit $\Delta V_o$. This is achieved without the use of low frequency power filters and without the use of a D.C. "link" between the converter and the discharge capacitor load $C_o$. Also, nowhere is a dissipative process of voltage wave shaping applied.

It is obvious to those skilled in the art, that one could connect a source of D.C. power to any pair of input terminals in the block 61 of FIG. 1. It is also obvious to those skilled in the art, that one could then remove the capacitors C12, C13 and C23 of the input filter 62 and all but two diodes Dij (j=1 through 6) in the block 63 of FIG. 1. If the polarity of the thus connected D.C. source is positive at the terminal marked $e_i$ (i=1,2) with respect to the terminal $e_j$ (j=2,3) with a lower index then the remaining two diodes can be shorted, since they serve no other purpose in this case. The ensuing operation of the converter will be exactly the same as in the above described case in which the electric energy is derived from a polyphase A.C. supply source.

Another embodiment of the same invention is shown in FIG. 3 and comprises a power converter which can generate a recurrent sequence of high voltage pulses as explained above. It is assumed that an A.C. power is derived from a three-phase supply with voltages $e_1$, $e_2$ and $e_3$ in block 61, as illustrated and discussed with reference to FIG. 1. This power is then processed by a high frequency filter in block 62, as described above. The switch matrix 63 comprises diodes Dij (j=1 through 6), which operate in conjunction with a half bridge, rather than a full bridge version of FIG. 1 as described in the above cited references. The material in the above cited references teaches, that the functional philosophy and the external characteristics of half and full bridge converters are identical, except for a factor of two concerning maximum current and voltage stresses in the respective switching components. However the product of these aforesaid stresses remains constant for both versions of the here presented converted, when compared at the same impedance and the same power level. Presentation of the converter in the full bridge configuration in FIG. 1 and in the half bridge configuration in FIG. 3 is, therefore, (1) a matter of convenience and (2) an indication of the multiplicity of possible forms of implementation.

The primary resonant circuit of FIG. 3 includes one inductor $L_{11}$ and capacitors $C_{11}$ and $C_{12}$. All of these elements are arranged in series and includes a one half switching bridge consisting of thyristors CR11 and CR21 and the antiparallel diodes D11 and D12 of FIG. 1. This series combination also includes the primary winding $W_1$ of the low or medium voltage power transformer XF. The concept of a primary and a secondary series resonant circuit is explained in further detail with reference to FIG. 3 in the second above cited reference. The winding $W_2$ of the transformer XF and the individual loops including the inductors $L_{o(2i-1)}$, the diodes $D_{(2i-1)}$ and the capacitors $C_{o(2i-1)}$ (i=0,1,2, ... N), form the path of current flow of the secondary resonant current $i_2$ for the condition that $l_2>0$. This current $i_2$ in the designated "forward" direction, here called $i_2^+$, branches then into its components $i_{2,i}$ which flow through the individual loops consisting of the corresponding elements $L_{oi}$, $D_i$ and $C_{oi}$, as defined above, and consistent with Kirchhoff's laws when the currents $i_{2,i}$ are flowing. These currents $i_{2,i}$ obey, furthermore, the law that:

$$\sum_{i=0}^{n} i_{2,i} = i_2^+ \tag{7}$$

and $$(i_{2,i})_{av} = (i_{2,i+2})_{av} \tag{8}$$

provided that the individual loop impedances are dimensioned accordingly. The reverse direction $i_2^-$ of the current $i_2$ is, analogously, divided into its components $i_{2-,i+1-}$, which flow through individual loops consisting of the corresponding elements $L_{oi+1}$, $D_{i+1}$ and series configurations of $C_{oi}$. Equations (7) and (8) hold for the elements of $i_2^-$ as much as for $i_2^+$, with the appropriate interpretation of indici.

The ensuing process of voltage multiplication by the number N of capacitors is described in the last named above cited reference. Thus, if a voltage $v_{o1} = aq\ e^*_{s\ av}$ develops over the first stage $C_{01}$ of the output capacitor $C_o$ and if this capacitor $C_o$ consists of a series arrangement of N such capacitors $C_o(2i-1)$ as defined above, then $$v_o = Naq\ e^*_s\ av_q \simeq 1 \tag{9}$$

or N times the voltage $v_{o1}$ over the first stage $C_{o1}$ of the output capacitor C. The above cited statement, well known to those skilled in the art, has withstood the test of time. However, the then reported innovation (1) did not include the element of efficiency which is needed for power applications and cannot be implemented with the use of inefficient RC networks, as stated and substantiated at the outset of this specification. The network which is described in the last named above cited reference does not include series inductors anywhere in the system. All diodes carry, therefore, peaking currents which cause substantial dissipation in the paths of conduction of the current $i_2$. Furthermore did the then reported innovation (2) not include the element of controllability in the sense that the output voltage $v_o$ need not be an integer multiple of the output voltage of a transformer winding which is connected to the points b'-c' of the discussed capacitor multiplier system. It is recalled here that the here disclosed invention includes the potential for (1a) efficient power transfer from the source of electric energy to the load concurrent with impedance matching or voltage scaling and (2a) output voltage stabilization and/or control, independent of external and/or internal effects such as input voltage variations, or changes of component characteristics due to ageing, variations of environmental conditions and other causes which could affect the occurrence of the intended transfer of energy.

(1b) The resonant current used for the power transfer in the here disclosed invention is limited by the nondissipative resonant series impedance, rather than by dissipative RC circuits of the old art. There is, therefore, in principle no limit to the efficiency of power transfer. (2b) The capacitormultiplier, as described with reference to FIG. 3, is being powered from a power converter employing series resonant circuits, as described in the first, the second and the fourth above cited references. This class of the aforesaid power converters has the output characteristic of a controllable current source. These converters can be devised to function, furthermore, as voltage limited current sources by application of the appropriate feedback techniques, as well known to those skilled in the art and as also explained in the above cited references. The converter which is being explained with reference to FIG. 3 can, therefore, control the power transfer from a source of energy to a load, using an internal mechanism, unlike the prior art.

The control mechanism, enclosed in block 40 of FIG. 3 functions exactly as previously described with reference to the FIGS. 1 and 2. However, only one polarity of the voltage of the secondary winding $W_2$ of transformer XF is now being blocked by the thyristor CR31 in the time interval $T_{of}$ in order to stop a further supply of current $i_2$ to the capacitor multiplier for the purpose of stopping a further increase of the output voltage $v_o$ of the converter. More explicitly, the current $i_2^+$, which emanates from the terminal b' of the aforesaid winding $W_2$ enters the capacitor multiplier at the time $T_{ch}$ shunted via thyristor CR31 to the terminal c' of the same winding $W_2$ of the transformer XF. This current $i_2^+$ cannot contribute to further build-up the output voltage $v_o$ because the transformer XF is short circuited in the $i_2^+$ direction. In the reverse direction $i_2^-$ the current $i_2$ does not contribute to the increase of $v_o$ because of the half bridge "driving" circuit of the converter. The ensuing current and voltage waveforms are an analogue of the waveforms shown in FIG. 2, except that the push-pull character of the waveforms depicted in said FIG. 2 is reduced to the effects of a half wave rectifier process. The corresponding effect and interpretation is well known to those skilled in the art. The process of control by way of shorting transformer XF at the time $T_{ch}$ is exactly the same as disclosed with reference to FIGS. 1 and 2. Control via the third winding $W_3$ in FIG. 1 can be avoided if the thyristors CR31 and CR32 are placed across the winding $W_2$ of the transformer XF. Both thyristors CR31 and CR32 are needed in FIG. 1 because of the push-pull character of the full bridge type converter. The third winding $W_3$ of the transformer XF in FIG. 1 was introduced for the purpose of convenience of electronic mechanization, and of explanation of a principle, rather than to indicate a unique form of physical implementation. A transformerless version of the converter of FIG. 3 is obtained if point b is connected to point b' and point c is connected to point c'. The transformer XF can then be removed to produce a transformer ratio a−1. The system which ensues from the above indicated connections functions exactly as described above for a 1:1 transformer. Yet, a galvanic separation of the source of electric energy and the load is retained through capacitors $C_{11}$ and $C_{12}$. The reference node of the output circuit can thus assume any voltage with respect to the reference node of the source of electric energy, provided the capacitors $C_{11}$ and $C_{12}$ can withstand the difference of potential and the voltage excursions, which are needed for the operation of these capacitors by the converter's functional mechanism. The above described galvanic isolation can be removed by connecting point d to d', thus shorting capacitor $C_{12}$, if so desired. The size of capacitor $C_{11}$ has to be adjusted accordingly.

The inductor $L_{11}$ can be reduced to zero if all inductors $L_{o(2i-1)}$ represent the series inductance $L_1$, as all inductors $L_{o(2i-1)}$ can be reduced to zero, so that $L_{ii} = L_1$, or any meaningful combination thereof, as well understood to those skilled in the art. The inductance value $L_o$, as defined with reference to equation (5) is interpreted accordingly, as well known to those skilled in the art.

In the writing of these specifications preferential use has been made of symbols and numbering used in the first four of the above cited references for the purpose of consistency and simplicity of notation. This includes the factor $q \approx 1$, which can be interpreted as a roughly approximate value for the efficiency of the concerned class of converter systems.

What is claimed is:

1. A converter circuit for receiving electrical energy from an electrical power source having a varying or an unregulated electrical potential and for storing a preselected quantity of electrical energy for transfer to a load, comprising in combination:
   controllable switch means connecting the electrical power source to receive electrical energy therefrom;
   electrical storage means for receiving and storing electrical energy;
   coupling means for transferring electrical energy between said controllable switch means and said electrical storage means;
   termination means for terminating the transfer of electrical energy between said controllable switch means and said electrical storage means;
   first sensor means for sensing the electrical energy in said electrical storage means;
   second sensor means for sensing the state of the converter circuit to determine the electrical energy that will be conveyed relative to said electrical storage means after termination of transfer of electrical energy between said controllable switch means and said electrical storage means; and
   control means receiving the output from said first and second sensor means for activating said termination means prior to the preselected quantity of electrical energy being established in said electrical storage means enabling the additional electrical energy transferred relative to said electrical storage means after activation of said termination means to produce the preselected quantity of electrical energy in said electrical storage means.

2. A converter as set forth in claim 1, wherein said coupling means includes a transformer interconnecting said controllable switch means and said electrical storage means; and
   said terminating means includes a third winding on said transformer with shorting means for short circuiting said third winding for terminating transfer of electrical energy, 3. A converter as set forth in claim 2, wherein said shorting means comprises controllable switch means connected across said third winding.

4. A converter as set forth in claim 1, wherein said coupling means includes a plural capacitor for providing coupling and galvanic isolation between said controllable switch means and said electrical storage means; and
   said terminating means includes controllable switch means interconnecting said plural capacitor for terminating transfer of electrical energy.

5. A converter as set forth in claim 1, wherein said electrical storage means includes a load capacitor.

6. A converter as set forth in claim 5, wherein said first sensor means includes means for measuring the voltage across said load capacitor.

7. A converter as set forth in claim 6, wherein said second sensor means includes means for measuring the current flow in the converter circuit.

8. A converter as set forth in claim 1, wherein said electrical storage means comprises a plurality of load capacitors connected in series to said coupling means to form a voltage divider network providing a multiple voltage output.

9. A converter as set forth in claim 1, including a high frequency filter interposed between said series resonant circuit and the electrical power source.

10. A high frequency link converter circuit for receiving electrical energy from an electrical power source having a varying or an unregulated electrical potential and for storing a preselected quantity of electrical energy for transfer to a load, comprising in combination:
   a series resonant circuit comprising first capacitor means and inductance means;
   a first set of controllable switch means connecting the electrical power source to said series resonant circuit for establishing oscillation therein;
   first control means connected to said first set of controllable switch means for controlling the current in said series resonant circuit to limit the voltage on said first capacitor means;
   electrical storage means for receiving and storing electrical energy;
   coupling means for transferring electrical energy between said series resonant circuit and said electrical storage means;
   termination means for terminating the transfer of electrical energy between said series resonant circuit and said electrical storage means;
   first sensor means for sensing the electrical energy in said electrical storage means;
   second sensor means for sensing the state of the converter circuit to determine the electrical energy that will be conveyed relative to said electrical storage means after termination of transfer of electrical energy between said series resonant circuit and said electrical storage means; and
   control means receiving the output from said first and second sensor means for activating said termination means prior to the preselected quantity of electrical energy being established on said electrical storage means enabling the additional electrical energy transferred relative to said electrical storage means after activation of said termination means to produce the preselected quantity of electrical energy in said electrical storage means.

11. A converter as set forth in claim 10, wherein said coupling means includes a transformer interconnecting said series resonant circuit and said electrical storage means; and
   said terminating means includes a third winding on said transformer with shorting means for short circuiting said third winding for terminating transfer of electrical energy.

12. A converter as set forth in claim 11, wherein said shorting means comprises controllable switch means connected across said third winding.

13. A converter as set forth in claim 10, wherein said coupling means includes a plural capacitor for providing coupling and galvanic isolation between said series resonant circuit and said electrical storage means; and
   said terminating means includes controllable switch means interconnecting said plural capacitor for terminating transfer of electrical energy.

14. A converter as set forth in claim 10, wherein said electrical storage means includes a load capacitor.

15. A converter as set forth in claim 14, wherein said first sensor means includes means for measuring the voltage across said load capacitor.

16. A converter as set forth in claim 15, wherein said second sensor means includes means for measuring the current flow in said series resonant circuit.

17. A converter as set forth in claim 10, wherein said electrical storage means comprises a plurality of load capacitors connected in series to said coupling means to form a voltage divider network providing a multiple voltage output.

18. A converter as set forth in claim 10, including a high frequency filter interposed between said series resonant circuit and the electrical power source.

19. A converter circuit for receiving electrical energy from an electrical power source having a varying or an unregulated electrical potential and for transfer to a load, comprising in combination:
   controllable switch means connecting the electrical power source to receive electrical energy therefrom;
   coupling means for transferring electrical energy between said controllable switch means and the load;
   termination means for terminating the transfer of electrical energy between said controllable switch means and the load;
   first sensor means for sensing the electrical energy in the load;
   second sensor means for sensing the state of the converter circuit to determine the electrical energy that will be conveyed relative to the load after termination of transfer of electrical energy between said controllable switch means and the load; and
   control means receiving the output from said first and second sensor means for activating said termination means prior to the preselected quantity of electrical energy being established in the load enabling the additional electrical energy transferred relative to the load after activation of said termination means to produce the preselected quantity of electrical energy in the load.

20. A converter circuit for transferring electrical power between a power source and a load, comprising in combination:
   a first and a second capacitor means;
   inductance means;
   means connecting said first and second capacitor means and said inductance means in series to form a series resonant circuit;
   a set of controllable switch means interconnecting said series resonant circuit to the power source;
   control means connected for selectively energizing said switch means for alternately charging said first and second capacitor means of said series resonant circuit; and
   means connecting the load between said first and second capacitor means for receiving electrical power from said series resonant circuit in accordance with the energizing of said switch means by said control means with said first and second capacitor means providing complete galvanic isolation between the load and the power source.

21. A converter circuit as set forth in claim 20, wherein said first and second capacitor means are of equal value.

22. A converter circuit for multiplying voltage furnished by a controllable power source to load means, comprising in combination:
   first and second storage capacitor means each having a first and a second terminal;

means connecting said first terminal of said first storage capacitor means to said second terminal of said second storage capacitor means for providing multiple voltage to the load means, a first set of unidirectional means connected in series between said first and second terminals of said first storage capacitor means for changing the charge thereon;

a second set of unidirectional means connected in series between said first and second terminals of said second storage capacitor means for changing the charge thereon;

a first transfer capacitor having a first and a second terminal;

first inductor means connected between the junction of said first set of unidirectional means and said first terminal of said first transfer capacitor;

second inductor means connected between the junction of said second set of unidirectional means and said second terminal of said first transfer capacitor; and means connecting the controllable power source between said first terminal of said first transfer capacitor and said second terminal of said first storage capacitor means.

23. A converter circuit as set forth in claim 22, wherein each of said first and second sets of unidirectional means comprises plural diodes with the anode of one diode being connected to the cathode of the other diode forming said junction thereat.

24. A converter circuit as set forth in claim 23, wherein said first and second sets of unidirectional means are established for providing the same polarity of charge on said first terminal of said first and second storage capacitor means.

25. A converter circuit as set forth in claim 22, wherein the size of said first and second storage capacitor means and said first transfer capacitor are selected to provide equal average voltage on said capacitors during operation.

26. A converter circuit as set forth in claim 22, wherein said first and second inductor means are each linear inductors.

27. A converter circuit as set forth in claim 22, including third storage capacitor means having a first and second terminal;

means connecting said second terminal of said third storage capacitor means to said first terminal of said second storage capacitor means;

a third set of unidirectional means connected in series between said first and second terminals of said third storage capacitor means for changing the charge thereon;

a second transfer capacitor having a first and a second terminal;

means connecting said first terminal of said second transfer capacitor to said second terminal of said first transfer capacitor; and third inductor means connected between the junction of said third set of unidirectional means and said second terminal of said second transfer capacitor.

* * * * *

UNITED STATES PATENT AND TRADEMARK OFFICE
CERTIFICATE OF CORRECTION

PATENT NO. : 4,355,351
DATED : October 19, 1982
INVENTOR(S) : FRANCISC C. SCHWARZ It is certified that error appears in the above-identified patent and that said Letters Patent are hereby corrected as shown below:

Col. 1, line 24    "freqeuncy" should be --frequency--

Col. 7, line 20    "an" should be --the--
       line 21    delete "a three-phase supply" and insert --the three phases--
       line 36    "verted" should be "verter"

Col. 9, line 41    "-" should be --=--
       line 59    "meaninful" should be --meaningful--

Signed and Sealed this

Eighth Day of February 1983

[SEAL]

Attest:

GERALD J. MOSSINGHOFF

Attesting Officer    Commissioner of Patents and Trademarks